Oct. 12, 1965     F. TERRANOVA     3,210,801
MEAT BONING MACHINE

Filed Oct. 28, 1963                                  3 Sheets-Sheet 1

INVENTOR.
FEDERICO TERRANOVA
BY
ATTORNEYS

Oct. 12, 1965   F. TERRANOVA   3,210,801
MEAT BONING MACHINE

Filed Oct. 28, 1963   3 Sheets-Sheet 2

INVENTOR.
FEDERICO TERRANOVA
BY
ATTORNEYS

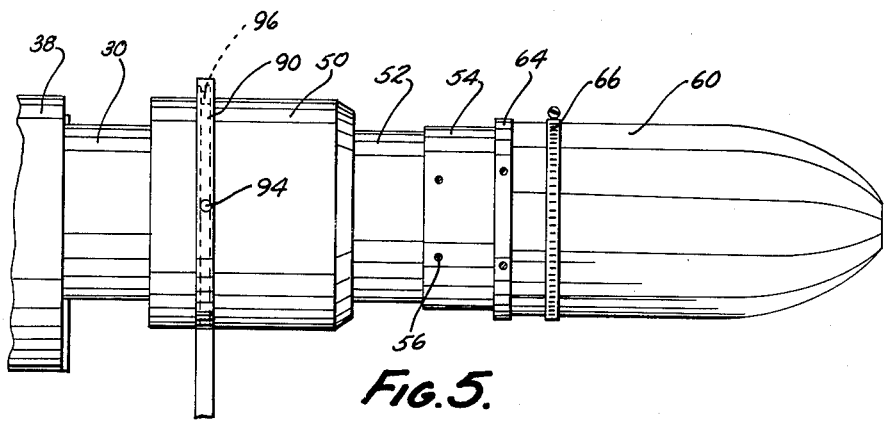
FIG. 5.
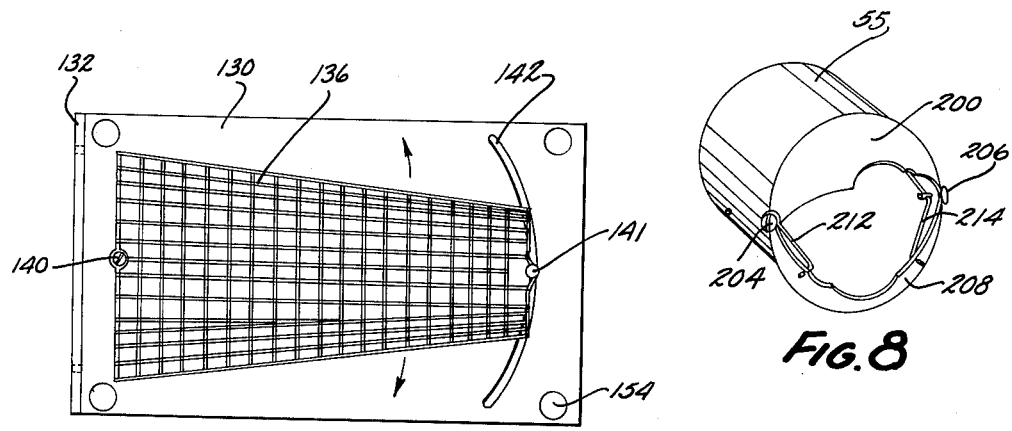
FIG. 6.
FIG. 8.
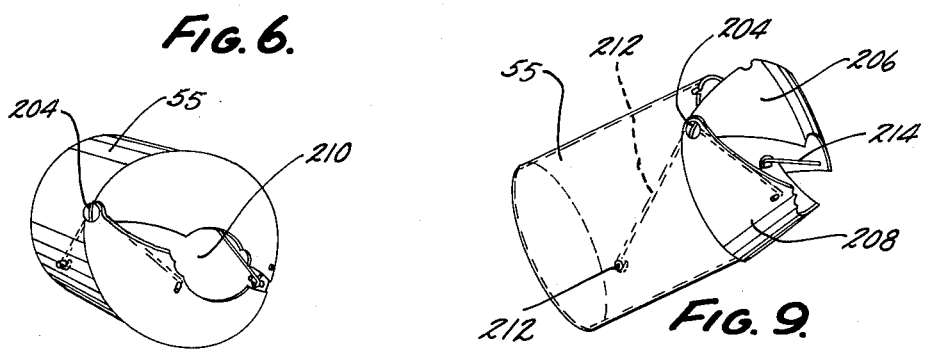
FIG. 7.
FIG. 9.
INVENTOR.
FEDERICO TERRANOVA
BY
ATTORNEYS

United States Patent Office 3,210,801
Patented Oct. 12, 1965

3,210,801
MEAT BONING MACHINE
Federico Terranova, 45 Parkview Drive NE.,
Grand Rapids, Mich.
Filed Oct. 28, 1963, Ser. No. 319,140
2 Claims. (Cl. 17—1)

This invention relates to a deboning apparatus, and more particularly to an apparatus for removing the bone from inside a meat section, such as a ham, without dissecting or damaging the surrounding meat.

This invention is an improvement of my prior invention described and claimed in U.S. Patent 2,785,434.

To debone a section of meat, particularly a ham or equivalent meat cuts from other animals, a skilled butcher normally requires a considerable length of time, as is known to anyone in the field. In fact, a skilled butcher can only debone about ten or twelve hams in a busy day under normal conditions. The meat is of course completely cut up.

The inventor herein, realizing these factors, and desiring to debone ham rapidly and to preserve the unity of the meat, devised the unique deboning apparatus set forth in the above identified U.S. patent. According to the basic principles of this unique structure, the meat is deboned by forcing it past a revolving annular cutter, the bone passing through the center and the meat around the outside. Although this prior apparatus was operative to achieve the result desired and was a tremendous improvement over manual methods, several unique improvements and refinements have been subsequently made to effect a boning machine that is even more rapid, is commercially acceptable, and provides a cleaner removal. It can accommodate the different bone configurations, sizes, and joint angles encountered in a remarkable manner. It will be realized that a typical section of meat such as a ham has a joint of substantial diameter in the center of the meat, with the adjacent bones being at an obtuse angle to the joint. To be a commercial reality, therefore, a deboning apparatus must be able to traverse these portions of various size, shape, and angle and must also be able to clean substantially all of the meat from all of these portions without waste of the high priced meat.

It is an object of this invention to provide a deboning apparatus capable of actually physically deboning a section of meat such as a ham or its equivalent in a few seconds, without destroying the unity of the meat. It is an object to do this without dissecting or any other way damaging or cutting the surrounding meat.

It is another object of this invention to provide deboning equipment capable of accommodating various size variations at the joint in the meat, angular variations, and unusual configurations encountered while yet cutting the meat cleanly from all portions of the bone so that only insignificant scraps remain on the bone.

It is another object of this invention to provide a deboning apparatus having the capacity to readily debone different sizes, kinds, and weights of meat without alteration. This may moreover be done on a high speed production basis, with each piece requiring only a few seconds.

It is another object of this invention to provide a deboning apparatus capable of allowing one person to debone literally hundreds of hams, or the equivalent, in a single day, and moreover to retain the meat in one undamaged piece with about 99% of the meat being removed from the bone. This is true even though the bone has unusual size configuration and angular variations, common for example, to the knee joint of a pig.

These and several other objects of this invention will become apparent upon studying the following specification in conjunction with the drawings in which:

FIG. 5 is a side elevational view of the cutter means of this apparatus;

FIG. 6 is a plan view of the meat retaining carriage or saddle of this invention;

FIG. 7 is a perspective view of the end of a modified cutter of this apparatus;

FIG. 8 is an end perspective view of the cutter illustrated in FIG. 7 shown expanded; and FIG. 9 is a perspective view of the cutter illustrated in FIGS. 7 and 8, showing its angular adaptability to accommodate bone joint angular variations.

Referring now specifically to the drawings, the assembly of the novel deboning apparatus 10 comprises a frame support subassembly 12, a cutter and cutter drive subassembly 14, and a carriage or saddle subassembly 16.

Figure 1:
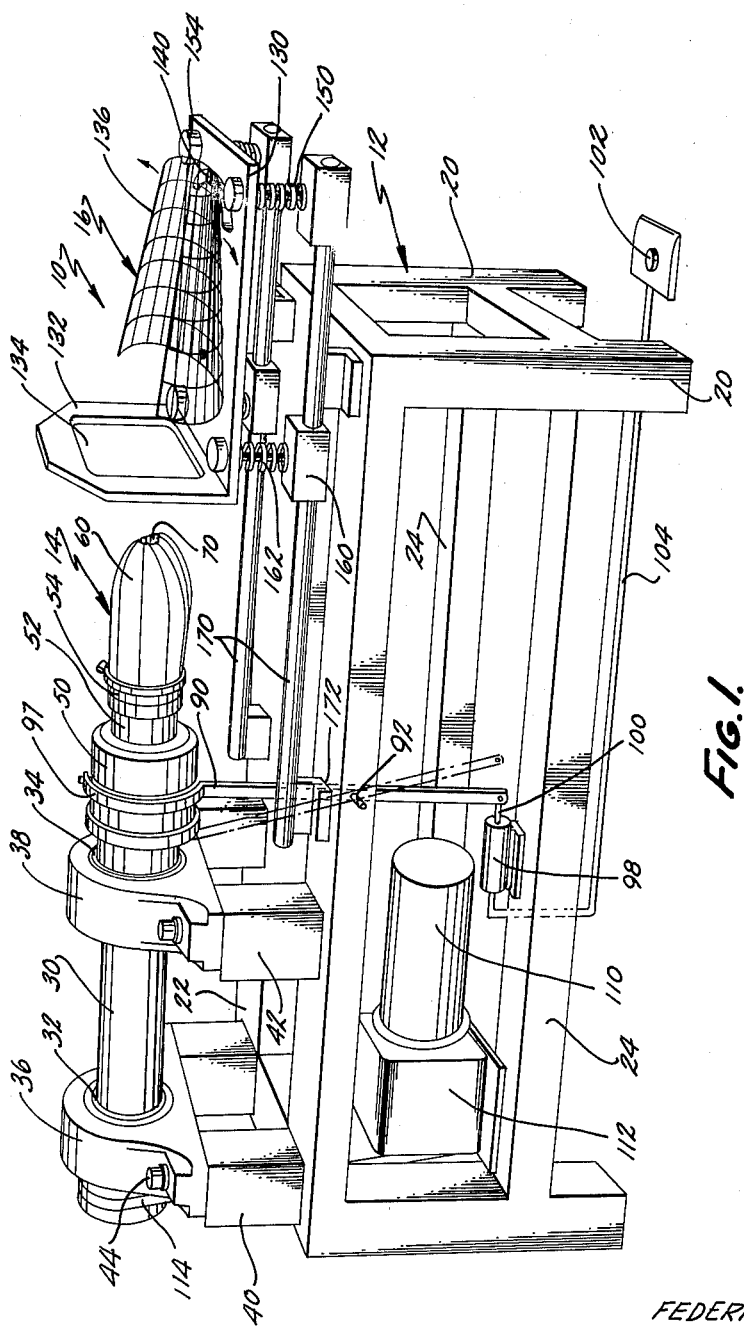
FIG. 1 is a perspective view of the novel deboning apparatus.

The supporting frame subassembly 12 may take any of various forms. It is illustrated in FIG. 1 to include a plurality of vertical legs 20 supporting a pair of top cross beams 22 which form the top surface. It thus resembles a table in configuration. It also includes a pair of lower, cross support beams 24 for support of accessories and for bracing.

The cutter subassembly 14 includes an elongated cylindrical tube 30 rotatably supported in a pair of spaced aligned bearings 32 and 34. These bearings form a part of a pair of pillow blocks 36 and 38 mounted respectively on supports 40 and 42 by elongated studs 44. The blocks are secured to the top of the table frame.

Positioned on one end of tubular shaft 30, adjacent pillow block 38, is a tubular collar 50 affixed around sleeve portion 52 as by tack weld. Fitting over the end of this sleeve portion 52 is a cylindrical sleeve portion 54 removably attached to portion 52 by suitable means such as set screws 56.

Portion 54 basically comprises a support cylinder for a plurality of cooperative steel cutter blades 60. These blades comprise individual elements which have the ends thereof fitted around the external periphery of sleeve portion 54 in adjacent relationship. The inner ends of these are abutted against an annular collar ring 64 attached to the outside of sleeve portion 54 by suitable means such as set screws. This collar ring serves to limit and set the position of the plurality of blade elements when mounted, and to maintain them in position. When the blades are all positioned around the periphery of the sleeve portion, a suitable snap-on type locking ring clamp 66 is attached around their periphery to hold them. This clamp may take the form of a typical hose clamp with a screw mounted tightener between the ends of the clamp, or any other equivalent form. When the blades are thus positioned, the free ends thereof all curve inwardly toward each other to overlap the adjacent blades in progressive fashion. Thus, referring to FIG. 2, the inwardly curved ends of the contracted blades overlap considerably, so that each blade has an edge that protrudes radially outwardly from the adjacent blade on one side, and has the other edge protruding inwardly over the other adjacent blade. The overlapping edges and the ends of the blades are sharpened. The plurality of blades form a continuous cutting edge of an extremely effective annular blade surface with stepped cutting portions adjacent the bone which passes through the cutter. The outer end of each of the blades is of a curved configuration to converge toward and have an inherent bias toward the other blades. They collectively terminate short of the ends of opposite blades to form a central opening 70. Each is flexible against this bias to enlarge the small central opening 70 as at 70′ (FIG. 3) when the blades are flexed outwardly. Even when the blades are flexed to the maximum, where the outer ends form a circle the diameter of the end of tube 30, the blades are still slightly overlapping to form a continuous cutting edge on the periphery of the mouth or opening. The blades have their free ends terminating at an angle acute to the center line of the cutter apparatus. Opening 70 is purposely made of a diameter sufficiently small to form a tight fit around the smallest diameter bone normally encountered.

Figure 2:
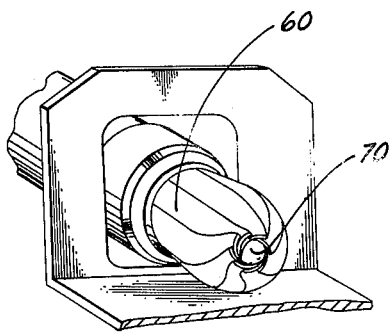
FIG. 2 is a fragmentary enlarged perspective view of the improved cutter means of the novel apparatus.
Figure 3:
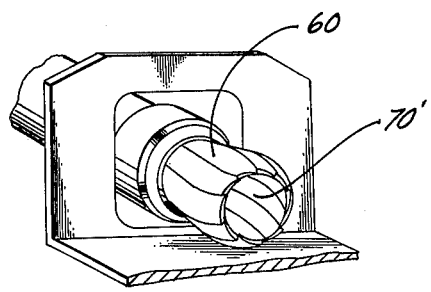
FIG. 3 is a perspective enlarged view of the cutter means shown expanded.
Figure 4:
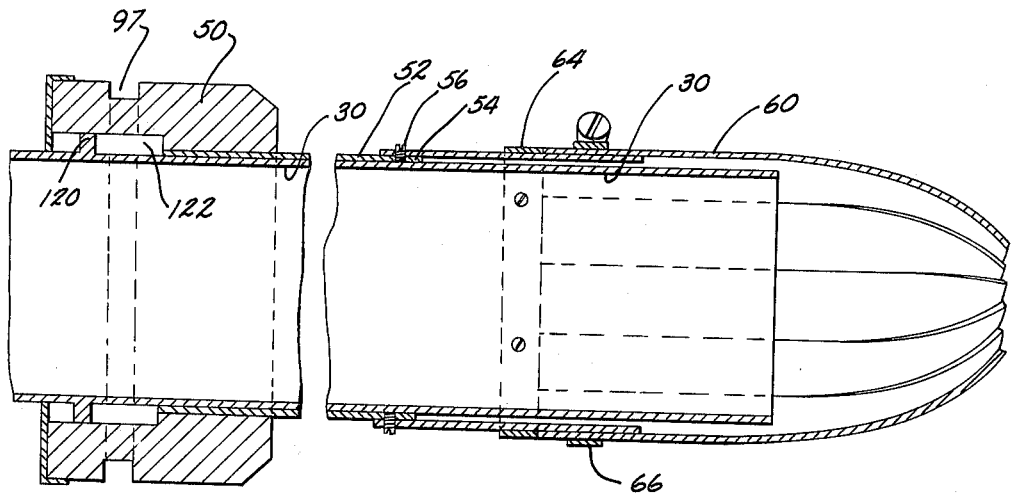
FIG. 4 is an enlarged side elevational sectional view through the cutter means of this invention.

To achieve the contraction and expansion of the cutter blade as shown in FIGS. 2 and 3, a slidable connection is formed between collar 50, sleeve portion 52, sleeve portion 54, and blades 60, on the one hand, and tubular support shaft 30, on the other hand. By reciprocating this collar and blade assembly on support shaft 30 toward pillow block 38, the fixed end of shaft 30 (FIG. 4) is abutted by the outer portion of the curved blades. Further shifting of the blades forces them to be spread or flexed radially outwardly by the end of tubular support 30, varying amounts depending upon the amount of shifting of the cutter assembly.

Collar 50 is shifted by arm 90. This arm is pivotally mounted near its central portion at 92 to crosspiece 22 of the frame subassembly. The upper end is attached to collar 50 by a pair of pins 94 and 96 fitting within enlarged annular recess 97 in the collar. By pivoting arm 90 as illustrated by the dotted lines in FIG. 1, the collar is shifted longitudinally on shaft 30. This shifting is preferably obtained by a fluid cylinder 98 mounted to frame element 24. Its shaft 100 extends into contact with the lower end of arm 90. The fluid cylinder is actuated by the foot of the operator, utilizing a pressure pad 102 communicating through conduit 104 with the end of cylinder 98. Thus, depression of the button on the pad shifts the cylinder rod to shift the cutter assembly. Other systems could conceivably be substituted for this actuator.

Support shaft 30 is rotatably driven by a suitable electrical motor 110 which drives a gear box 112 to drive belt 114. The drive belt extends from a pulley on gear box 112 to a V-belt groove on the extended end of shaft 30. The rotational motion of shaft 30 is imparted to collar 50 by a suitable connection such as a pin and groove interfit. The radially extending pins or bosses (FIG. 4) extend into longitudinally elongated slots 122 in collar 50. This allows axial movement of the collar along sleeve 30 while still maintaining the rotational drive relationship therebetween. Obviously other suitable equivalents may be employed. Thus, the plurality of cutters are rotatably driven.

The carriage subassembly 16 is adapted to reciprocate toward and away from the cutter means. This carriage or saddle includes a platform 130 having an optional front bracket 132 with an opening 134 through which the cutter can pass. Mounted on this platform is a sleeve type cage 136 preferably formed of heavy gauge wire rod in mesh form. The cage has its sides curled up. It is generally convergent from the front adjacent the cutter means to the rear end. This enables a ham or the equivalent to be placed in the cage and retained under cutting pressure applied axially on the ham.

The forward end of the cage is pivotally attached at its center 140 to platform 130. This enables the cage to be oscillated laterally, thereby enabling the ham to be altered in its angle of orientation as the bone is fed through the cutter. This accommodates passage of the bones around the obtuse angle adjacent the joint, as will be described more specifically hereinafter. The rear end of cage 136 is attached by a pin 141 fitting within an arcuate guide slot 142. This provides added support to the cage when cutting pressure is applied, while not restricting its oscillatory movement. The platform 130 is resiliently supported on a plurality of compression coil springs 150, preferably four springs at the four corners of the platform. These springs are retained on the upper ends within the upstanding tubular housings 154 attached to the platform. The springs extend down into contact with four respective slide blocks or sleeves 160, and are maintained aligned by central posts 162 which extend up through the compression coiled springs from the blocks to housings 154. The springs are compressible in accordance with the weight of the meat applied, so that the bone in the meat will always align substantially well with central opening 70 of the cutter means. Thus, even when larger hams are placed in the saddle cage, for example, the carriage will lower automatically to align the bone with the cutter opening. When smaller hams are placed thereon, the carriage will be at a higher level to align the bone with the opening.

The slide blocks 160 are slidably mounted on a pair of guide rods 170 which form guide ways. These are in turn attached to the table frame by brackets 172 at their front and rear ends.

*Operation*

To debone a ham or other equivalent pieces of meat from other animals, the ham is placed in cage 136 with its larger end toward the cutter. The weight of the ham automatically vertically positions the carriage or saddle so that the center bone is substantially aligned with the opening 70 of the cutter means. The motor 110 is then started, to rotationally drive sleeve 30, collar 50, and the cutter blades.

The carriage is pushed toward the revolving cutter so that the cutter begins to cut around the bone in the ham. The cutter blades normally require slight flexing to expand opening 70 just sufficient to receive the bone. The cutter is then allowed to contract around the bone to sever all meat therefrom as it rotates. As the ham is pushed further into the cutter, the large knee joint in the meat is encountered, indicated to the operator by the resistance to further movement. As soon as this occurs, the operator depresses his foot pedal 102 the necessary amount. Fluid pressure shifts arm 97 to shift collar 50 and the cutter blades axially. This forces them against the extended end of sleeve 30 (FIG. 4) to widen the mouth by flexing the blades against their inherent bias (FIG. 3).

As the joint is passed over, the bone on the opposite side of the joint and at an obtuse angle to the initial bone, is encountered. Consequently, the carriage or i.e. the cage 136 is shifted laterally approximately 10 to 20 degrees about its pivot to accommodate this difference in bone angle. The blades are again allowed to contract to a smaller opening 70, while the carriage is pushed further past the cutter. It will be realized that the meat is sufficiently flexible to readily accommodate the changes in blade positions and the angular shift in the carriage. During the cutting, the bone passes down through tube 30 and the meat passes around the outside of the cutter. After the cut is complete, the meat is merely slid off the cutter. After the meat is smoked, the opening closes up so completely that a person cannot even tell a bone was initially in the meat. The meat is firm and attractive. Even if not smoked, the meat is unitary, not sliced up or damaged, in sharp contrast to prior hand cutting methods. The bone remains temporarily in tube 30. Subsequent ham bones push the bones progressively through, to drop them out the opposite end of the hollow tube adjacent the drive connection. Of course, the bones remaining in the machine at the end of the day can be pushed out with a suitable rod.

It has been found in repeated experimentation that hams can be completely deboned within a matter of a few seconds. A maximum of ten seconds is common. Only one operator is needed to employ the apparatus. He need not be skilled. About 99% of the meat is removed from the bone, so that substantially no waste at all occurs.

*Modification of cutter means*

Referring to FIGS. 7, 8 and 9, a modified form of cutter means is there shown. This modified cutter has two distinct advantages. Firstly, it is especially effective to cut around the knee cap of a ham bone joint. By using this two-piece jaw, with both pieces pivotally mounted on the same pivot axis to the support, one of the jaws can effectively shift by itself to move over the knee cap. Secondly, the two jaws can shift laterally together to more readily accommodate changes of angle around the joint.

Referring to FIGS. 7, 8 and 9, the tubular sleeve portion 55 there shown has the two jaws 200 and 202 pivotally mounted thereto by suitable screws or studs 204 and 206 mounted on the same pivot axis. The two jaws together form a frusto-conical cutter, with the top of the frusto-cone comprising a generally circular opening 210. Thus, each of the jaws form half of the frusto-cone and has a semi-circular end opening.

Each of the jaws has a biasing means such as the wire spring element 212 for jaw 208 and wire spring element 214 for jaw 206. Each wire element extends from an attachment screw 218 on sleeve portion 55, through the stud or screw 204, and then bent through an opening in the jaw 208. The jaws are thus biased to a closed position. It will be noted that the jaws not only are capable of opening away from each other to enlarge the opening therebetween, but also will shift together on the pivotal axis to place opening 210 at an angle with respect to the center line of the sleeve portion, and thus of the entire assembly. This versatile universal type action of the jaws helps accommodate the angle change quickly and cleanly. Also, as mentioned previously, one of the jaws can shift as it passes over the knee cap so that the knee cap is never gouged out. This structure is rotatably driven during operation, and is driven by the same combination described with respect to the first embodiment.

Various additional advantages may occur to those in the art upon studying the foregoing forms of the invention. Also, it is realized that in adopting this structure in various meat packing houses, butcher shops, and the like, certain minor structural modifications can be made to facilitate production of the apparatus or adoption to particular conditions. These minor changes, when within the concepts of the invention as described and claimed, are thus part of this invention, which is not to be limited merely to the preferred illustrated form depicted and described, but only by the scope of the appended claims and the reasonably equivalent structures to those defined therein.

I claim:

1. A meat deboning apparatus comprising: an elongated rotatably-mounted, tubular, cutter support; blade clamping means; a plurality of blades secured in an annulus on one end of said support by said clamping means; said blades each comprising a curved element having a sharpened edge and end; all of said blades converging and being overlapping at the free ends thereof to form a generally continuous annular cutting surface around a central mouth with radially stepped cutting edges; said blades being flexible to bend outwardly varying amounts under force against an inherent bias to thereby enlarge said mouth to allow larger bone portions to pass through; said blades when so flexed still remaining in overlapping relationship; an internal tubular shaft axially shiftable in said tubular cutter support to flex said blades; a shiftable carriage adjacent said cutter means to shift the meat with bone into said cutter means; a meat support saddle sleeve means on said carriage generally divergent toward said cutter means to receive and retain the meat; said sleeve means being pivotally mounted to said carriage at the central portion of the end thereof adjacent said cutter means to allow angular joints to be passed through said cutter means; vertically adjustable means for said carriage; and said carriage being supported on said vertically adjustable means to be automatically shiftable in proportion to the weight of the meat in said saddle to align the bone in the meat with said central cutter opening.

2. A meat deboning apparatus comprising: a support assembly; an annular rotatable cutter means mounted on said support assembly; a rotatable hollow shaft supporting said cutter means; said cutter means comprising a plurality of blade portions having convergent free ends; said free ends having sharpened ends and side edges, and circumferentially overlapping each other to form a series of consecutive radially displaced cutting edges with a continuous circular cutting end; said convergent free ends forming a generally circular bone-receiving mouth; shiftable expander means inside said cutter means to deform said blade portions and expand said mouth in controlled fashion, causing said blades to slide circumferentially over each other; and a meat retention saddle mounted to ride on said support assembly towards and away from said mouth and cutter means; being laterally convergent toward the end of said saddle opposite said cutter means to retain the meat under axial cutting pressure; the end of said saddle adjacent said cutter means being pivotally mounted to allow said saddle to oscillate laterally with respect to said cutter means; and an arcuate guide means positioned at the end of said saddle opposite said cutter means.

References Cited by the Examiner
UNITED STATES PATENTS

| | | | |
|---|---|---|---|
| 1,435,877 | 11/22 | Reubold | 17—1 |
| 1,982,779 | 12/34 | Ayars | 146—52 |
| 2,189,484 | 2/40 | Brodeur | 17—11 |
| 2,435,473 | 2/48 | Sonnenberg. | |
| 2,785,434 | 3/57 | Terranova | 17—1 |
| 2,846,942 | 8/58 | Bowman | 17—44.1 X |
| 2,914,026 | 11/59 | Greenwood | 19—103 |

SAMUEL KOREN, *Primary Examiner.*
LUCIE H. LAUDENSLAGER, *Examiner.*